(12) United States Patent
Tu et al.

(10) Patent No.: US 9,544,442 B2
(45) Date of Patent: Jan. 10, 2017

(54) LINGERING CANCELLATION FOR DATA ENCODED AUDIO SIGNALS

(71) Applicant: Acer Incorporated, New Taipei (TW)

(72) Inventors: Po-Jen Tu, New Taipei (TW); Jia-Ren Chang, New Taipei (TW); Ming-Chun Fang, New Taipei (TW); Chia-Hsun Lee, New Taipei (TW); Wen-Cheng Hsu, New Taipei (TW); Hsiao-Chi Hsu, New Taipei (TW); Ying-Ta Chen, New Taipei (TW); Kai-Yu Huang, New Taipei (TW); Chao-Kuang Yang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 14/284,507

(22) Filed: May 22, 2014

(65) Prior Publication Data

US 2015/0134327 A1    May 14, 2015

(30) Foreign Application Priority Data

Nov. 13, 2013    (TW) .............................. 102141201 A (51) Int. Cl.
| H04L 27/10 | (2006.01) |
| H04M 9/08 | (2006.01) |
| H04L 27/14 | (2006.01) |
| H04L 25/497 | (2006.01) |

(52) U.S. Cl.
CPC ............ *H04M 9/082* (2013.01); *H04L 25/497* (2013.01); *H04L 27/14* (2013.01); *H04L 27/10* (2013.01)

(58) Field of Classification Search
None
See application file for complete search history.

(56) References Cited

U.S. PATENT DOCUMENTS

| 4,425,665 A * | 1/1984 | Stauffer | .................. H04L 27/10 |
| | | | 329/302 |
| 5,606,464 A * | 2/1997 | Agazzi | ............. G11B 20/10009 |
| | | | 360/46 |
| 6,636,560 B1 * | 10/2003 | Gatherer | ............... H04L 25/497 |
| | | | 375/219 |

(Continued)

OTHER PUBLICATIONS

Fejzo et al "Cancellation of ISI in non-linear voice-band data channels", ICASSP Apr. 27-30, 1993, pp. 388-391 vol. 3.*

(Continued)

*Primary Examiner* — Huyen Vo
*Assistant Examiner* — Yi-Sheng Wang
(74) *Attorney, Agent, or Firm* — Edell, Shapiro & Finnan, LLC (57) ABSTRACT

Presented herein are techniques to reduce error probability and eliminate the lingering signal that causes problems during audio signal data transmission. An electroacoustic transducer of a first electronic device receives a data encoded audio signal that includes modulated digital data therein. The data encoded audio signal is demodulated to produce a present input signal that includes a target frequency and a lingering effect of a previously received data encoded audio signal. Lingering cancellation is performed on the present input signal to produce a present output signal from which the lingering effect of the previously received data encoded audio signal has been removed.

18 Claims, 7 Drawing Sheets

(56) References Cited

U.S. PATENT DOCUMENTS

2012/0300828 A1* 11/2012 Erez .................. H04L 1/0059
375/230

OTHER PUBLICATIONS

Biglieri et al "Adaptive Cancellation of Nonlinear Intersymbol Interference for Voiceband Data Transmission" IEEE Journal on Selected Areas in Communications, vol. SAC-2, No. 5, Sep. 1984.*
Fejzo et al ("Cancellation of ISI in non-linear voice-band data channels", ICASSP Apr. 27-30, 1993, pp. 388-391 vol. 3).*

* cited by examiner

LINGERING CANCELLATION FOR DATA ENCODED AUDIO SIGNALS

RELATED APPLICATION DATA

This application claims priority under 35 U.S.C 119 to Taiwan patent application, TW 102141201, filed on Nov. 13, 2013, the disclosure of which is incorporated herein by reference.

TECHNICAL FIELD

Background

Techniques have been developed where audio signals are used for data transmission. During such audio signal data transmission techniques, digital data is combined with inaudible analog audio signals. The resulting data encoded audio signals are transmitted (emitted) by a speaker or other electroacoustic transducer that produces sound in response to an electrical signal.

The data encoded audio signals transmitted by the speaker are detected by a microphone or other acoustic-to-electric transducer/sensor that converts sound into an electrical signal. The data encoded audio signals are decoded to extract the original data.

A large number of electronic devices, including portable devices such as mobile phones, laptop computers, tablet computers, etc., include speakers and/or microphones. As such, audio signal data transmission techniques provide a mechanism for such devices to communicate in a unique manner. For example, the audio signal data transmission techniques provide a content delivery platform that provides web page, video, application, or other data to a user. In one illustrative arrangement, inaudible audio signals that include advertisement information can be broadcasted within a retail store. When a user enters the store with his/her mobile phone that includes a microphone, the microphone will receive the audio signal and the advertisement can be displayed on the mobile phone.

SUMMARY

In accordance with certain embodiments presented herein, a method is provided. The method comprises receiving, at an electroacoustic transducer of a first electronic device, a data encoded audio signal that includes modulated digital data therein; demodulating the data encoded audio signal to produce a present input signal that includes a target frequency and a lingering effect of a previously received data encoded audio signal; and performing lingering cancellation on the present input signal to produce a present output signal from which the lingering effect of the previously received data encoded audio signal has been removed.

In accordance with other embodiments, an apparatus is provided. The apparatus comprises a microphone configured to receive a data encoded audio signal that includes modulated digital data therein and to convert the data encoded audio signal into an electrical signal; a demodulator configured to demodulate the electrical signal obtained from the data encoded audio signal to produce a present input signal that includes a target frequency and a lingering effect of a previously received data encoded audio signal; and a lingering cancellation module configured to use the present input signal to produce a present output signal from which the lingering effect of the previously received data encoded audio signal has been removed.

BRIEF DESCRIPTION OF THE DRAWINGS

Embodiments are described herein in conjunction with the accompanying drawings, in which.

DESCRIPTION OF EXAMPLE EMBODIMENTS

Figure 1:
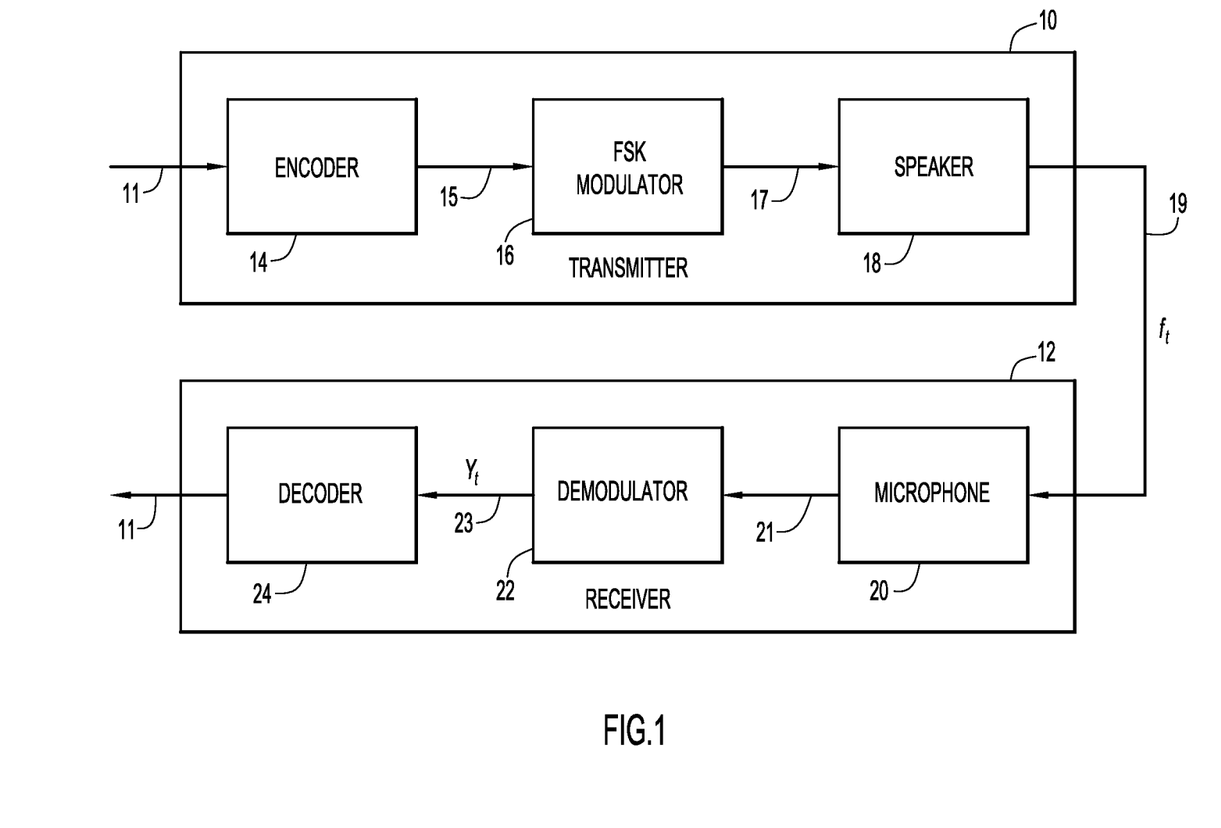
FIG. 1 is a block diagram illustrating an audio signal transmitter and an audio signal receiver configured for transmission and receipt, respectively, of data encoded audio signals.

FIG. 1 is a block diagram illustrating an audio signal transmitter 10 and an audio signal receiver 12 configured to use audio signals for data transmission. That is, the transmitter 10 and receiver 12 are configured to execute audio signal data transmission techniques to exchange data encoded audio signals. The transmitter 10 comprises an encoder 14, Frequency-shift Keying (FSK) modulator 16, and a speaker 18. The receiver 12 comprises a microphone 20, demodulator 22, and a decoder 24. The transmitter 10 is part of a first electronic device while the receiver 12 is part of a second electronic device.

In FIG. 1, encoder 14 generates encoded data signals 15 from the original/initial data 11. The encoded data signals 15 are provided to FSK modulator 16. The FSK modulator 16 uses FSK modulation to generate electrical signals 17 used to drive speaker 18 in a manner that represents the data 11. In particular, the electrical signals 17 drive the speaker 18 such that the speaker transmits an audio signal 19 where the original data 11 is represented by changes in the frequency (pitch) (i.e., each frequency represents a respective data value). The transmitted audio signals 19 are referred to herein as data encoded audio signals and may be represented as $f_t$.

The data encoded audio signals 19 are received at microphone 20. The microphone 20 converts the data encoded audio signals 19 into an electronic signal 21 that is provided to demodulator 22. Demodulator 22 demodulates the electrical signal 21 to generate a demodulated output signal 23. The demodulated output signal may be represented as $Y_t$. The demodulated output signal $Y_t$, which is represented in FIG. 1 by reference 23, is then decoded at decoder 24 to retrieve the original data 11.

Figure 2:
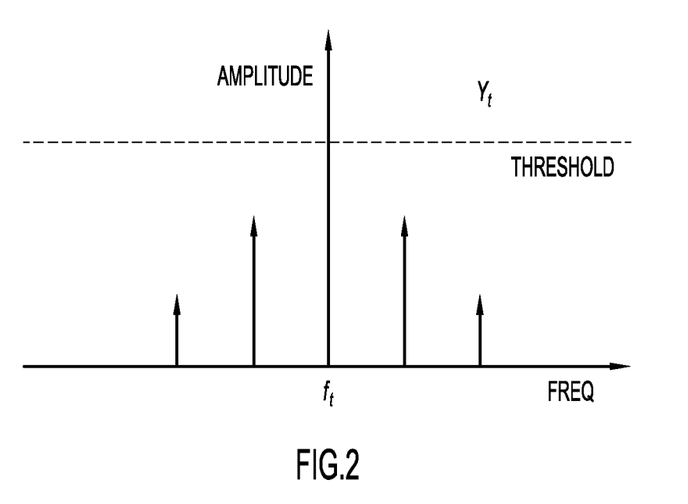
FIG. 2 is a graph illustrating the frequency spectrum of an audio signal received at an audio signal receiver in accordance with ideal conditions.

In cases where the frequency duration of the data encoded audio signals 19 is sufficiently long, the vibration of the speaker 18 is competent, and the speaker 18 sends different frequency signals at different times, then the receiver 12 is able to fully receive and decode the original data 11. That is, in such circumstances, the receiver 12 is able to determine, at each time t, the specific frequency representing the data for time t. FIG. 2 illustrates such a scenario where the demodulated output signal $Y_t$, is equal to the transmitted signal $f_t$ (i.e., $Y_t=f_t$).

As shown in FIG. 2, many frequency signals (e.g., harmonics) are present after demodulation. However, not all of these frequencies are useable for decoding the original data. For example, due to the use of FSK modulation, only one frequency may represent the digital data. In order to determine/detect the useable frequencies (and thus the associated data), an amplitude threshold may be used as a selection mechanism. More specifically, where the amplitude of $f_t$ exceeds the threshold, that frequency is considered to be useful and to be preserved, resulting in $Y_t=f_t$. In one example, a threshold of at least 80% of the maximum amplitude may be set.

Figure 3:
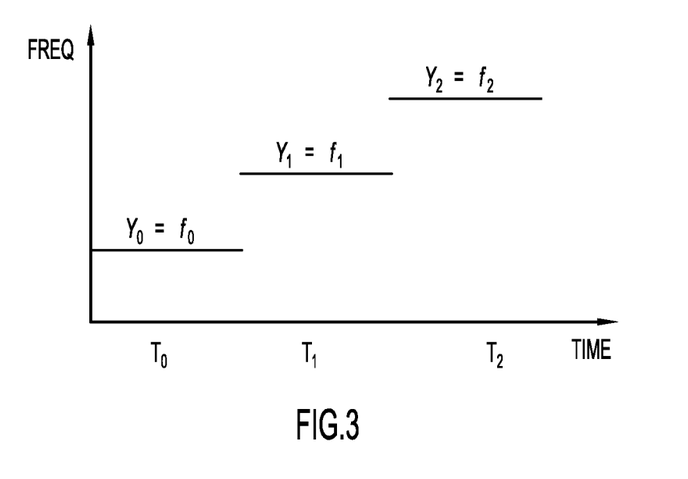
FIG. 3 is a graph illustrating the relationship between transmitted signals and signals output by the audio signal receiver in accordance with the ideal conditions of FIG. 2.

FIG. 3 illustrates the demodulation result corresponding to the arrangement of FIG. 2. More specifically, FIG. 3 illustrates a situation where a data encoded audio signal 19 has a different detectable frequency at each of different times. In other words, each of the received audio signals has a useful frequency that is detectable/determinable such that the demodulation result is a signal with a signal detectable frequency at different time (i.e., a single frequency having an amplitude greater than the set threshold).

As noted above, the ability to detect a frequency at each of the different times (i.e., where $Y_t=f_t$) occurs, for example, when the frequency duration of the data encoded audio signals 19 is sufficiently long, the vibration of the speaker 18 is competent (e.g., ideal), and the speaker 18 sends different frequency signals at different times. In practice, such an ideal situation may not be possible. For example, if the frequency duration of the data encoded audio signals 19 is not long enough and/or the vibration of speaker 18 is incompetent (e.g., non-ideal), then the microphone 20 will receive data encoded audio signals where a single frequency is not easily detectable through the threshold comparison mechanism.

Figure 4:
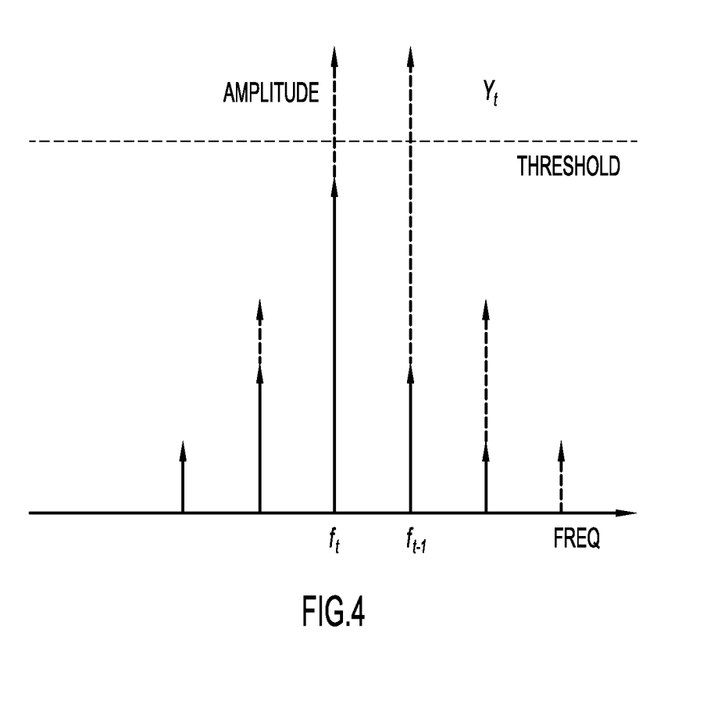
FIG. 4 is a graph illustrating the frequency spectrum of an audio signal received at an audio signal receiver in accordance with example practical conditions.
Figure 5:
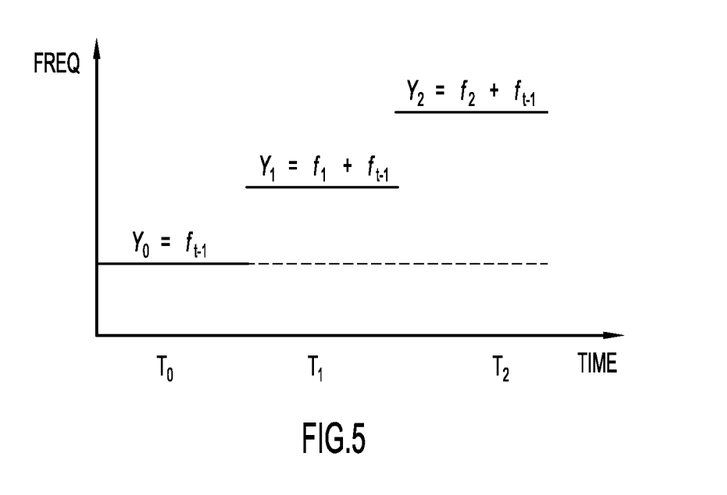
FIG. 5 is a graph illustrating the relationship between transmitted signals and signals output by the audio signal receiver in accordance with the example conditions of FIG. 4.

Stated differently, when using audio signal data transmission (i.e., transmission of data in an audio signal), in order to improve transmission rate, the data transform rate may need to be increased to a level that sometimes exceeds the load range of a transmitting speaker. Although transmission of an audio signal may cease, some lingering effect, referred to herein as a lingering signal, may remain. As shown in FIGS. 4 and 5, the lingering signal may cause errors at the receiver 12 that prevents identification of the single frequency and extraction of the data 11.

In circumstances were a lingering signal is present, the demodulated output signal $Y_t$, is not equal to the transmitted signal $f_t$. Instead, due to the lingering effect of the previously transmitted audio signal, the output signal $Y_t$ is equal to the transmitted signal plus a lingering amount of a previously transmitted signal $f_{t-1}$. In other words, $Y_t=f_t+f_{t-1}$. That is, the frequency components including harmonics of $f_{t-1}$ constructively interfere with the primary tone $f_t$.

FIG. 4 illustrates an example of such a scenario where $f_{t-1}$ constructively interfere with the primary tone $f_t$. In FIG. 4, $f_t$ is depicted by unbroken lines, and the lingering effect of $f_{t-1}$ is depicted by the broken lines. The broken line spectrum is substantially identical to the unbroken line spectrum, but shifted to the right and added on top of the unbroken line spectrum of $f_t$.

As shown in FIG. 4, the amplitude of both $f_t$ and $f_{t-1}$ exceed the threshold criteria. As a result, the above noted threshold selection mechanism results in the selection of both of the frequencies for subsequent use. This results in the output signal $Y_t$ that, as noted above, includes both $f_t$ and $f_{t-1}$.

FIG. 5 illustrates the demodulation result corresponding to the arrangement of FIG. 4. As shown, a lingering signal, represented as $f_{t-1}$, is present that influences the present output signal $Y_t$. As such, the output signal at time 1 ($Y_1$) is equal to the signal transmitted at time 1 ($f_1$) and the lingering signal $f_{t-1}$ (i.e., $Y_1=f_1+f_{t-1}$). Additionally, the output signal at time 2 ($Y_2$) is equal to the signal transmitted at time ($f_2$) and the lingering signal $f_{t-1}$ (i.e., $Y_2=f_2+f_{t-1}$). Accordingly, the receiver 12 is unable to determine which single frequency represents the original data.

Presented herein are techniques that exploit a relationship between a current/present signal (next signal) and the previous signal (last signal) to reduce error probability and eliminate the lingering signal that causes problems in conventional arrangements. More specifically, the techniques presented herein provide a method to cancel the lingering signal and some noise with fixed frequency. The techniques presented herein generate an output signal with only one frequency that represents the original data sent at a corresponding time.

Figure 6:
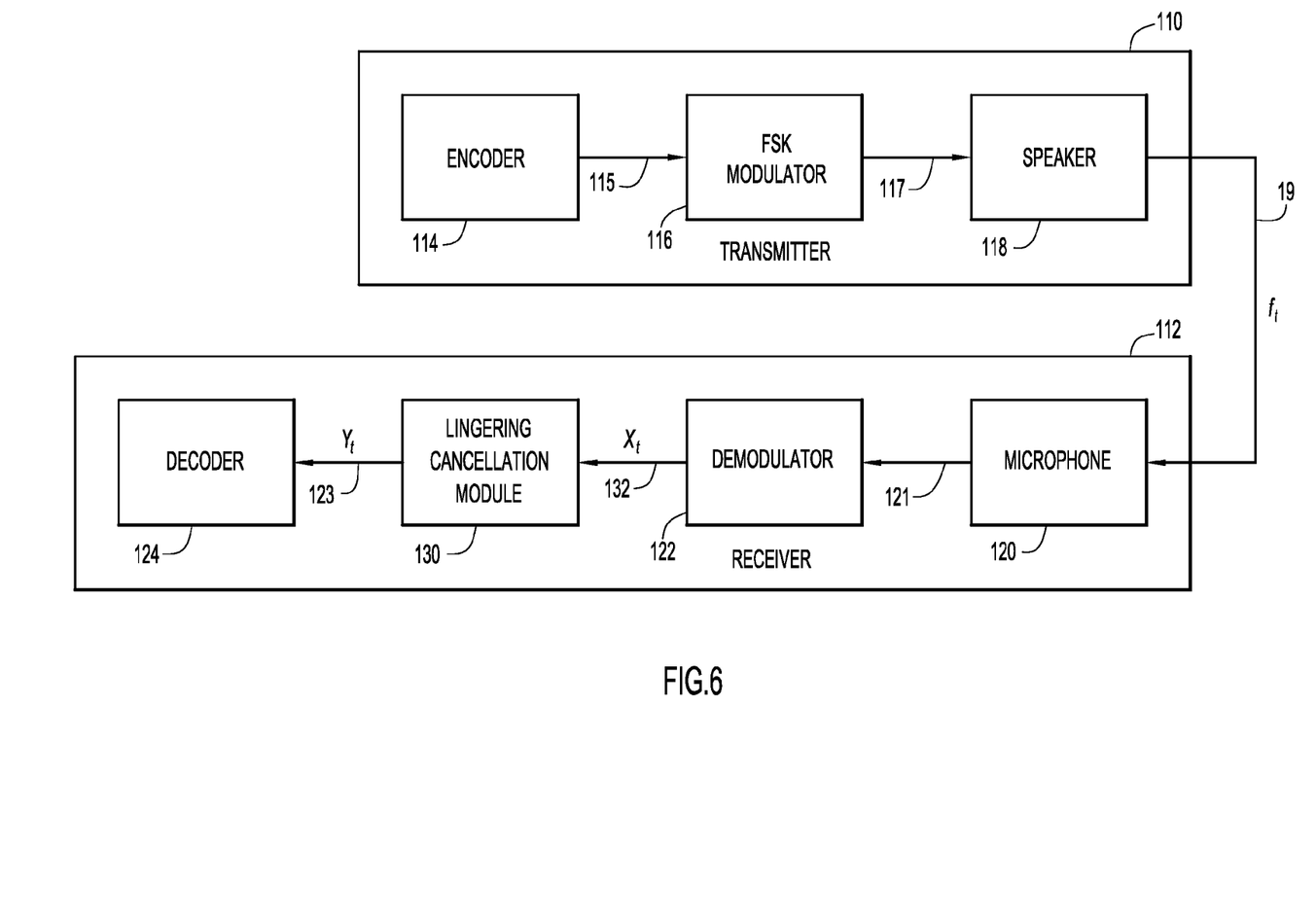
FIG. 6 is a block diagram illustrating an audio signal transmitter and an audio signal receiver configured to implement lingering cancellation techniques in accordance with embodiments presented herein.

FIG. 6 is a block diagram illustrating an audio signal transmitter 110 and an audio signal receiver 112 configured to perform lingering cancellation in accordance with embodiments presented herein. The transmitter 110 comprises an encoder 114, FSK modulator 116, and a speaker 118. The receiver 112 comprises a microphone 120, demodulator 122, a lingering cancellation module 130, and a decoder 124. The transmitter 110 is part of a first electronic device while the receiver 112 is part of a second electronic device.

In FIG. 6, encoder 114 generates encoded data signals 115 from the original/initial data 111. The encoded data signals 115 are provided to FSK modulator 116. The FSK modulator 16 uses FSK modulation to generate electrical signals 117 used to drive speaker 118 in a manner that represents the data 111. In particular, the electrical signals 117 drive the speaker 118 such that the speaker transmits an audio signal 119 where the original data 111 is represented by changes in the frequency (pitch) (i.e., each frequency represents a respective data value). The transmitted audio signals 119 are referred to herein as data encoded audio signals and may be represented as $f_t$.

The data encoded audio signals 119 are received at microphone 120. The microphone 120 converts the data encoded audio signals 119 into an electronic signal 121 that is provided to demodulator 122. Demodulator 122 demodulates the electrical signal 121 to generate a demodulated signal 132 that is input into lingering cancellation module 130. For ease of reference, the signal 132 is referred to herein as a present input signal $X_t$ and may include the target frequency and the lingering effect of a previous signal. The lingering module 130 is configured to eliminate the lingering effects of the previously received audio signal from the present input signal $X_t$ to produce the output signal at time t ($Y_t$). In other words, the present output signal $Y_t$ is a signal from which the lingering effects of a previous signal have been removed. The present output signal $Y_t$, which is represented in FIG. 6 by reference 123, is then decoded at decoder 124 to retrieve the original data.

In accordance with embodiments presented herein, the frequency of the starting signal $Y_0$ is fixed and is known at the receiver 112. The present output signal after lingering cancellation $Y_t$ relates to the present input signal $X_t$, the previous input signal $X_{-1}$ (i.e., the input signal generated from the previously received audio signal), and the previous output signal $Y_{t-1}$.

Figure 7:
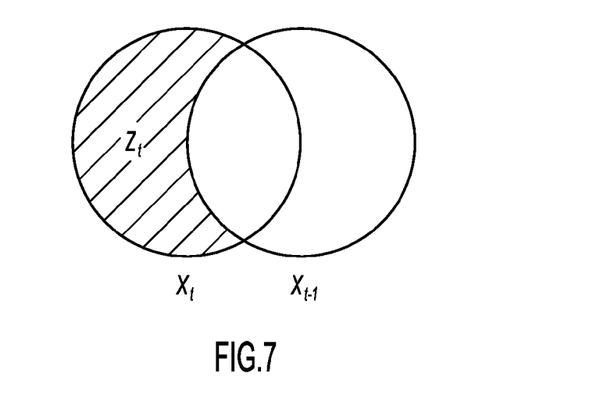
FIG. 7 is a schematic diagram illustrating the intersection of a present demodulated audio signal and a previously received audio signal.

Several operations are performed during the lingering cancellation in lingering cancellation module 130. First, an intersection value ($W_t$) is calculated. In accordance with embodiments presented herein, the intersection value represents the intersection of the input signal $X_t$ and the previous input signal $X_{-1}$. The intersection of the input signal $X_t$ and the previous input signal $X_{t-1}$ is schematically illustrated in FIG. 7.

Using the intersection value, a difference value ($Z_t$) is then calculated as shown below in Equation 1. In accordance with embodiments presented herein, the difference value is the value of the input signal $X_t$ minus the intersection value (i.e., the value representing the intersection of the input signal $X_t$ and the previous input signal $X_{t-1}$).

$$Z_t = X_t - (X_t \cap X_{t-1}) \quad \text{Equation 1}$$

Given Equation 1, the correct present output signal $Y_t$ can be expressed as shown below in Equation 2.

$$Y_t = \begin{Bmatrix} Z_t, & Z_t \neq 0 \\ Y_{t-1}, & Z_t = 0 \end{Bmatrix} \quad \text{Equation 2}$$

As defined in Equation 2, when $Z_t$ has a value of zero, the output signal $Y_t$ is equal to the previous output signal $Y_{t-1}$. However, when $Z_t$ has a non-zero value (i.e., is not zero), the output signal $Y_t$ is equal to $Z_t$. As a result, the output signal $Y_t$ would be only one frequency, either $Y_t$ or $Y_{t-1}$ ($Y_t = Y_{t-1}$ when $Z_t = 0$ or $Y_t = Z_t$ when $Z_t \neq 0$).

Figure 8:
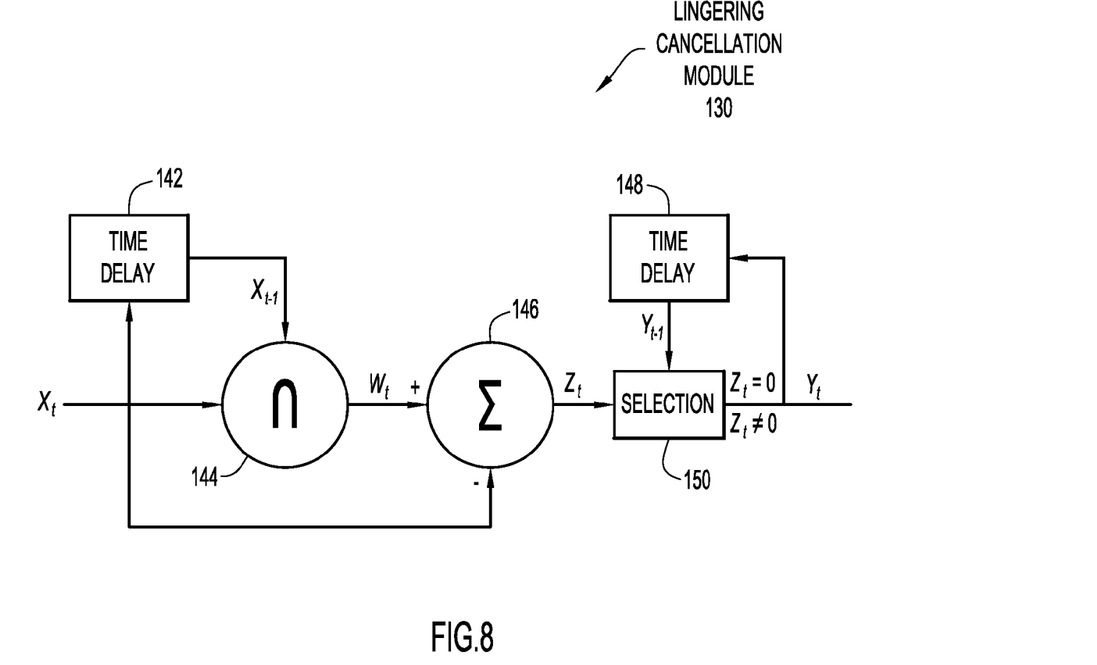
FIG. 8 is a schematic block diagram of a lingering cancellation module in accordance with embodiments presented herein.

FIG. 8 is a schematic diagram of one arrangement of the lingering cancellation module 130 configured to execute the lingering cancellation operations corresponding to Equations 1 and 2, above. As shown, lingering cancellation module 130 comprises a first time delay block 142, an intersection calculation block 144, a summation block 146, a second time delay block 148, and a selection block 150.

As shown in FIG. 8, the time delay block 142 stores the previous input signal $X_{t-1}$. The intersection calculation block 144 uses this previous input signal $X_{t-1}$ and the present input signal $X_t$ to determine the intersection of the signals (i.e., intersection of $X_t$ and $X_{t-1}$). As noted above, the intersection of $X_t$ and $X_{t-1}$ is referred to as $W_t$.

The summation block 146 uses the calculated intersection value to determine the difference value $Z_t$. In other words, the summation block 146 subtracts $W_t$ (the intersection of the previous input signal $X_{t-1}$ and the present input signal $X_t$) from the present input signal $X_t$. The selection block 150 evaluates the difference value $Z_t$ to determine if it has a value of zero or a non-zero value. When selection block 150 determines that $Z_t$ has a value of zero, then lingering cancellation module 130 determines that the present output signal $Y_t$ should be set equal to the previous output signal $Y_{t-1}$. However, when selection block 150 determines that $Z_t$ has a non-zero value (i.e., is not zero), then lingering cancellation module 130 determines that the present output signal $Y_t$ should be set equal to $Z_t$.

Table 1, below, illustrates the various signals $X_t$, $Z_t$, $Y_t$, $W_t$ at three different times, time 1 (T1), time 2 (T2), and time 3 (T3) in accordance with one example. These values generally correspond with the signals of FIG. 5 as processed by the lingering cancellation module 130 of FIGS. 6 and 8.

TABLE 1

|       | T0        | T1              | T2              |
|-------|-----------|-----------------|-----------------|
| $X_t$ | $f_{t-1}$ | $f_{t-1} + f_1$ | $f_{t-1} + f_2$ |
| $Z_t$ | None      | $f_1$           | $f_2$           |
| $Y_t$ | $f_{t-1}$ | $f_1$           | $f_2$           |
| $W_t$ | None      | $f_{t-1}$       | $f_{t-1}$       |

Figure 9:
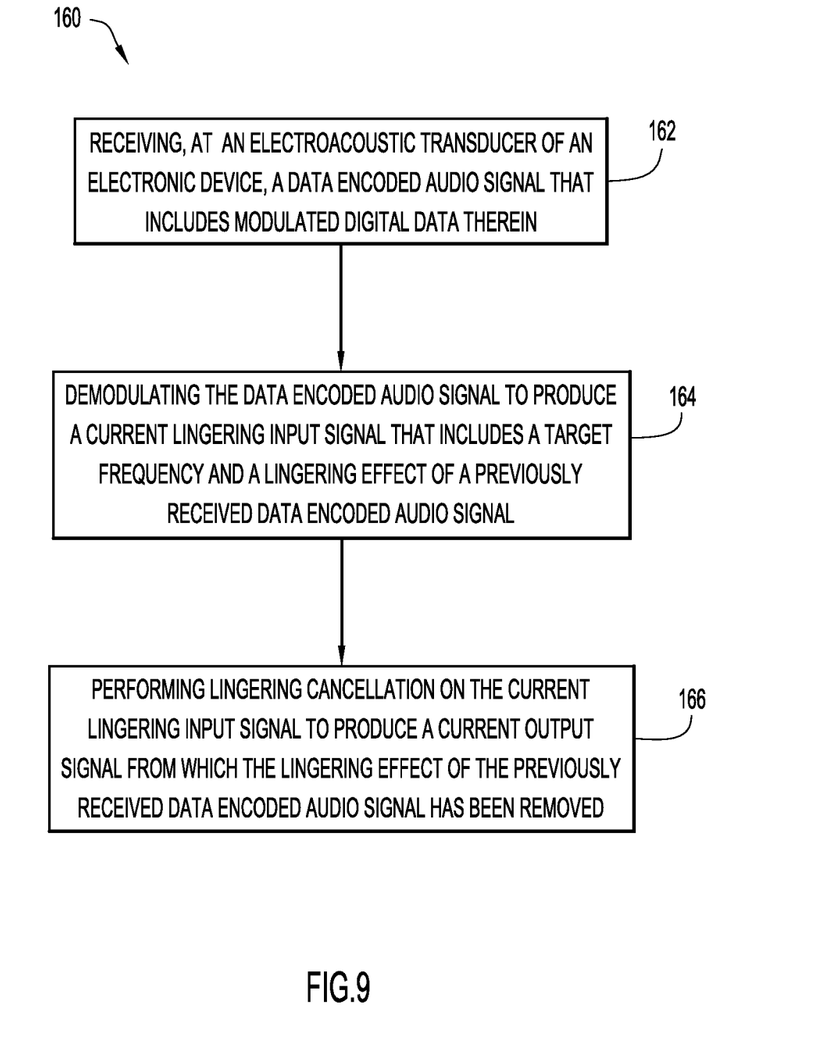
FIG. 9 is a flowchart of a method for processing data encoded audio signals in accordance with embodiments presented herein.

FIG. 9 is a flowchart of a method 160 in accordance with embodiments presented herein. Method 160 begins at 162 where a speaker or other electroacoustic transducer of an electronic device receives a data encoded audio signal that includes modulated digital data therein. In one embodiment, the received data encoded audio signal includes data modulated in accordance with a FSK modulation technique such that a frequency of the audio signal represents (corresponds to) a piece of digital data.

At 164, the received data encoded audio signal is demodulated to produce a present input signal that includes a target frequency and a lingering effect of a previously received audio signal. At 166, lingering cancellation is performed on the present input signal to produce a present output signal from which the lingering effect of the previously received audio signal has been removed.

Figure 10:
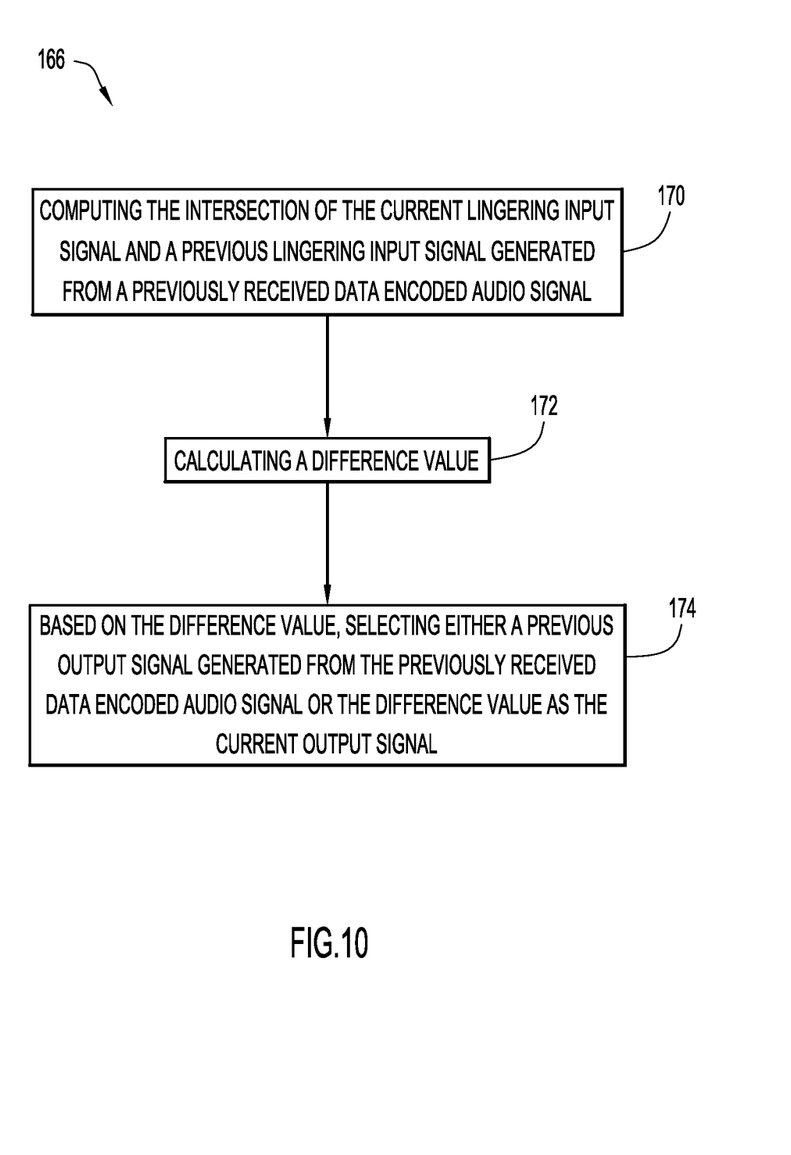
FIG. 10 is a flowchart of a method for lingering cancellation in accordance with embodiments presented herein.

FIG. 10 is a flowchart of the operations performed at step 166 of FIG. 9 in accordance with an embodiment presented herein. The operations of step 166 begin at 170 where an intersection value is calculated. The intersection value represents the intersection of the present input signal and a previous input signal generated from a previously received data encoded audio signal is calculated.

At 172, a difference value is calculated using the calculated intersection value and the present input signal. In particular, the intersection of the present input signal and the lingering input signal generated from a previously received audio signal is subtracted from the present input signal.

At 174, the difference value is evaluated to generate the present output signal from which the lingering effect of the previously received audio signal has been removed. More specifically, the difference value is evaluated at 174 to determine if the difference value has a value of zero or a non-zero value. When it is determined that difference value has a value of zero, then the lingering cancellation module outputs a present output signal that is equal to the previous output signal generated from the previously received data encoded audio signal. However, when it is determined that the difference has a non-zero value (i.e., is not zero), then the lingering cancellation module outputs a present output signal that is equal to the difference value.

The above description is intended by way of example only.

What is claimed is:

1. A method, comprising:
    receiving, at an electroacoustic transducer of a first electronic device, a data encoded audio signal that includes modulated digital data therein;

demodulating the data encoded audio signal to produce frequency signals including a target frequency and a lingering effect of a previously received data encoded audio signal;

selecting a set of one or more frequencies in the frequency signals with amplitudes above a predetermined threshold to produce a present input signal;

computing an intersection value representing the intersection of the present input signal with a previous input signal, the previous input signal generated from the previously received data encoded audio signal by selecting a set of one or more frequencies with amplitudes above the predetermined threshold from frequency signals demodulated from the previously received data encoded audio signal;

calculating, using the intersection value, a difference value; and based on the difference value, selecting either a previous output signal generated from the previously received data encoded audio signal or the difference value as the present output signal.

2. The method of claim 1, wherein selecting either the previous output signal generated from the previously received data encoded audio signal or the difference value as the present output signal comprises:

selecting the previous output signal generated from the previously received data encoded audio signal when it is determined that the difference value has a value of zero.

3. The method of claim 1, wherein selecting either the previous output signal generated from the previously received data encoded audio signal or the difference value as the present output signal comprises:

selecting the difference value as the present output signal when it is determined that the difference value has a non-zero value.

4. The method of claim 1, wherein calculating the difference value comprises:

calculating a difference between the present input signal and the intersection value.

5. The method of claim 1, wherein receiving the data encoded audio signal comprises:

receiving an audio signal that includes data modulated in accordance with a Frequency-shift Keying (FSK) modulation technique such that a frequency of the audio signal represents a piece of digital data.

6. The method of claim 1, further comprising:

transmitting the data encoded audio signals to the receiver using an electroacoustic transducer of a second electronic device.

7. An apparatus, comprising:

a microphone configured to receive a data encoded audio signal that includes modulated digital data therein and to convert the data encoded audio signal into an electrical signal;

a demodulator configured to demodulate the electrical signal obtained from the data encoded audio signal to produce frequency signals including a target frequency and a lingering effect of a previously received data encoded audio signal; and a lingering cancellation module configured to:
select a set of one or more frequencies in the frequency signals with amplitudes above a predetermined threshold to produce a present input signal;

compute an intersection value representing an intersection of the present input signal with a previous input signal generated from a previously received data encoded audio signal, the previous input signal generated from the previously received data encoded audio signal by selecting a set of one or more frequencies with amplitudes above the predetermined threshold from frequency signals demodulated from the previously received data encoded audio signal;

based on the intersection value, calculate a difference value; and based on the difference value, select either a previous output signal generated from the previously received data encoded audio signal or the difference value as the present output signal.

8. The apparatus of claim 7, further comprising:

a decoder configured to extract digital data from the present output signal.

9. The apparatus of claim 7, wherein to select either the previous output signal generated from the previously received data encoded audio signal or the difference value as the present output signal, the lingering cancellation module is configured to:

select the previous output signal generated from the previously received data encoded audio signal when it is determined that the difference value has a value of zero.

10. The apparatus of claim 7, wherein to select either the previous output signal generated from the previously received data encoded audio signal or the difference value as the present output signal, the lingering cancellation module is configured to:

select the difference value as the present output signal when it is determined that the difference value has a non-zero value.

11. The apparatus of claim 7, wherein to calculate the difference value, the lingering cancellation module is configured to:

calculate a difference between the present input signal and the intersection value.

12. The apparatus of claim 7, wherein the microphone is configured to receive an audio signal that includes data modulated in accordance with a Frequency-shift Keying (FSK) modulation technique such that a frequency of the audio signal represents a piece of digital data.

13. A method, comprising:

receiving a first data encoded audio signal that includes modulated digital data therein;

demodulating the first data encoded audio signal to produce frequency signals including a target frequency and a lingering effect of a previously received data encoded audio signal;

selecting a set of one or more frequencies in the frequency signals with amplitudes above a predetermined threshold to produce a present input signal;

computing an intersection value, wherein the intersection value is the intersection of the present input signal with a previous input signal generated from a previously received data encoded audio signal by selecting a set of one or more frequencies with amplitudes above the predetermined threshold from frequency signals demodulated from the previously received data encoded audio signal; and determining a present output signal based on the intersection value.

14. The method of claim 13, wherein determining the present output signal based on the intersection value comprises:

calculating a difference value based on the intersection value; and based on the difference value, selecting either a previous output signal generated from the previously received data encoded audio signal or the difference value as the present output signal.

15. The method of claim 14, further comprising:

selecting the previous output signal as the present output signal when it is determined that the difference value has a value of zero.

16. The method of claim 14, further comprising:

selecting the difference value as the present output signal when it is determined that the difference value has a non-zero value.

17. The method of claim 14, wherein calculating a difference value comprises:

calculating a difference between the present input signal and the intersection value.

18. The method of claim 13, wherein receiving the data encoded audio signal comprises:

receiving an audio signal that includes data modulated in accordance with a Frequency-shift Keying (FSK) modulation technique such that a frequency of the audio signal represents a piece of digital data.

* * * * *